United States Patent

[11] 3,593,376

| [72] | Inventors | Laurence J. Kisker<br>Lancaster;<br>William G. Mathewson, Tonawanda, both of, N.Y. |
|---|---|---|
| [21] | Appl. No. | 718,712 |
| [22] | Filed | Apr. 4, 1968 |
| [45] | Patented | July 20, 1971 |
| [73] | Assignee | J.W. Clement Company<br>Depew, N.Y. |

[54] APPARATUS FOR MAKING MULTIPLE-IMAGE ELECTROTYPE MOLDS
3 Claims, 13 Drawing Figs.

[52] U.S. Cl. .................................................. 18/16 R, 18/19 R
[51] Int. Cl. .................................................. B29c 3/00
[50] Field of Search .......................................... 18/16, 19 P, 35, 17 H, DIG. 29; 25/DIG. 21

[56] References Cited
UNITED STATES PATENTS

| 2,390,803 | 12/1945 | Marschner | 18/19 (P) X |
| 2,680,882 | 6/1954 | Hirschmann et al. | 18/19 (P) X |
| 2,694,227 | 11/1954 | Fordyce et al. | 18/19 (F) X |
| 2,849,752 | 9/1958 | Leary | 18/19 (M) X |
| 2,926,385 | 3/1960 | Willson | 18/19 (F) X |
| 3,194,047 | 7/1965 | Eggert et al. | 18/19 (P) X |

Primary Examiner—J. Spencer Overholser
Assistant Examiner—Michael O. Sutton
Attorney—Bean & Bean ABSTRACT: A method and apparatus for preparing multi-image matrices for printing plates from photoengravings or the like in the black-white and multicolor printing industries; featuring use of a thermoplastic mold sheet impressed successively at adjacent areas thereof against a single engraving, to produce a multi-image mold. The apparatus includes mold register guide-forming means functioning automatically to precisely register the mold sheet as it is shifted from one impression operation to another. Also, the apparatus features means for insulating each previously made image impression against resoftening and/or deformation incidental to subsequent processing of the mold sheet in the mold press.

PATENTED JUL20 1971

INVENTORS.
LAURENCE J. KISKER
WILLIAM G. MATHEWSON
BY
Bean + Bean
ATTORNEYS

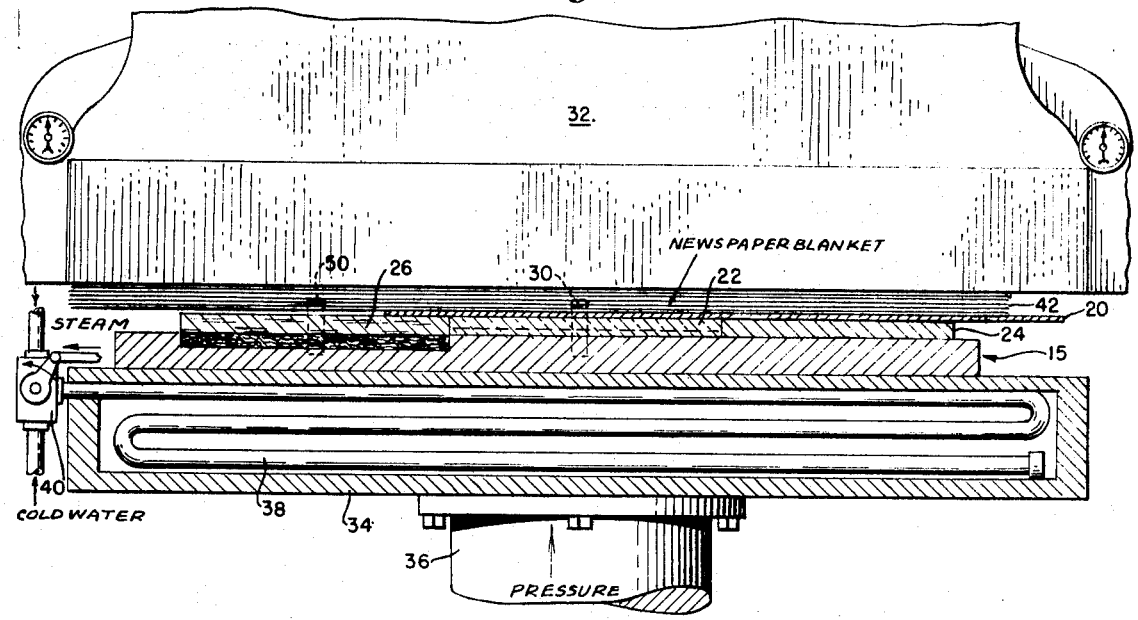
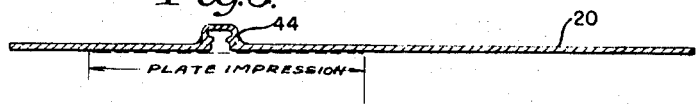
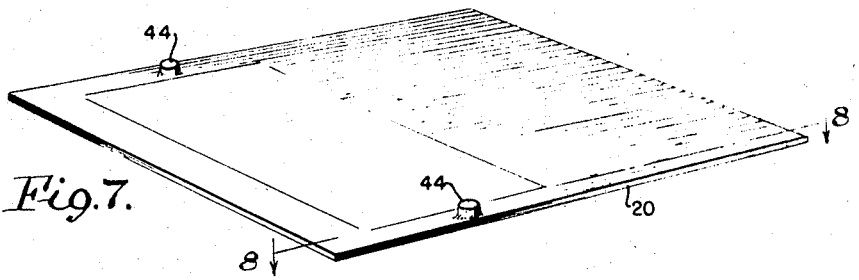
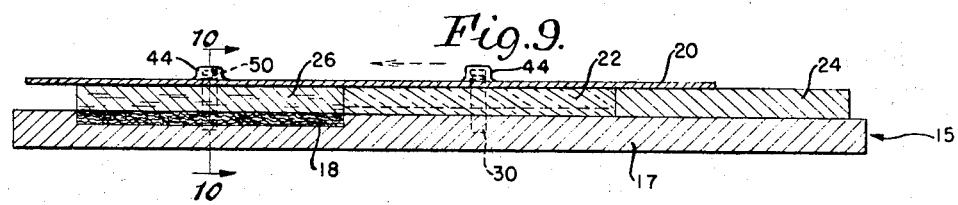
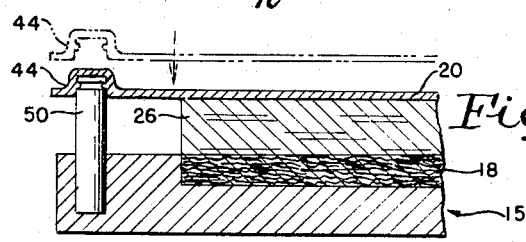

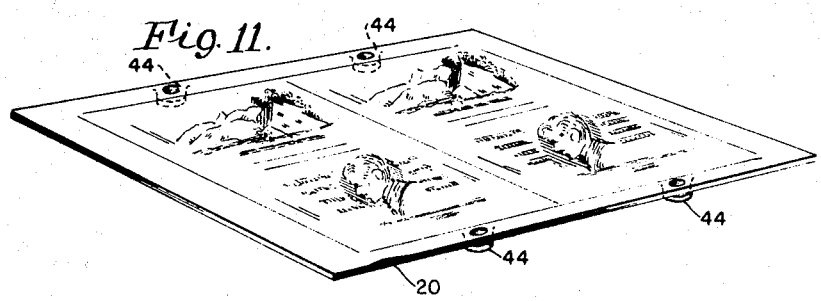
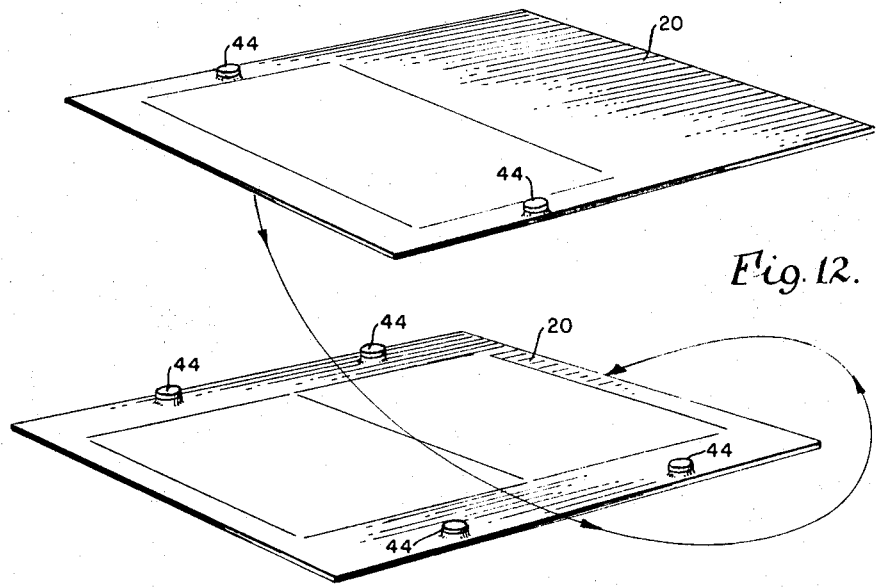
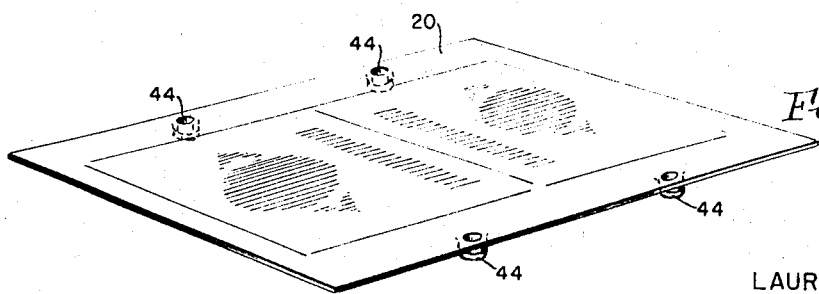

APPARATUS FOR MAKING MULTIPLE-IMAGE ELECTROTYPE MOLDS

BACKGROUND AND OBJECTS OF THE PRESENT INVENTION

Various schemes have been previously employed in the so-called "Step and Repeat" plate-making processes for effecting registry of multiple images on a single electrotype mold or matrix or the like but with only limited success; thereby necessitating exercise of extreme expertize and time-consuming manual operations. It is the primary object of the present invention to provide a method and apparatus such as may be employed by relatively unskilled personnel to speedily produce accurately registered multi-image molds.

Other objects and advantages of the invention will appear from the following specification and the accompanying drawing, wherein:

IN THE DRAWING

FIG. 1 is a top perspective view of a jig device as used in connection with the method of the present invention;

FIG. 2 corresponds to FIG. 1 but illustrates a first step in the method of the present invention; comprising the mounting on the jig of an engraving and at opposite sides thereof a pair of mold sheet support devices;

FIG. 3 corresponds to FIG. 2 but illustrates the next step in the process of the invention, comprising placement of a mold sheet upon the assembly of FIG. 2;

FIG. 6 is a view corresponding somewhat to FIG. 4 but illustrating the assembly thereof while being subjected to a mold press operation, comprising the next step of the process;

FIG. 7 is a top perspective view of the mold sheet when removed from the press following the first pressing operation thereon;

FIG. 8 is a fragmentary section taken as suggested by line 8-8 of FIG. 7;

Figure 1:
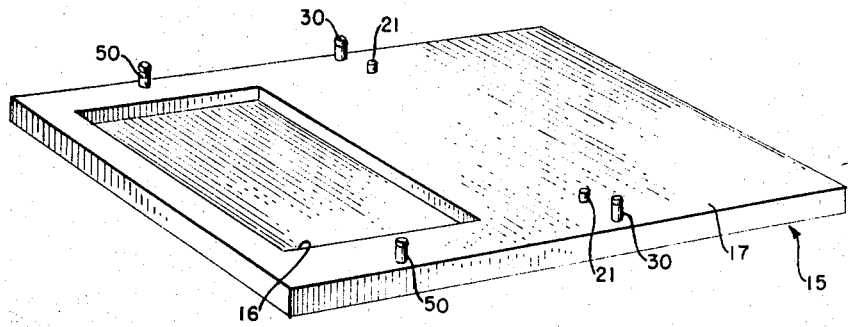

FIG. 9 corresponds somewhat to FIG. 6 but illustrates the result of a second pressing operation on the same mold sheet;

FIG. 10 is a fragmentary enlarged scale sectional view taken as suggested by line 10-10 of FIG. 9;

FIG. 11 is a bottom perspective view of the mold sheet subsequent to the second operation as illustrated at FIG. 9;

FIG. 12 diagrammatically illustrates an alternative sheet press progression method; and FIG. 13 is a bottom perspective view corresponding to FIG. 11 but illustrating the multiple-image arrangement produced by the progression method of FIG. 12.

DETAILED DESCRIPTION

As illustrated by the drawing herewith at FIG. 1-10, the apparatus of the present invention includes a "jig" which is designated generally at 15 and comprises a generally rectangular rigid plate made of steel or the like. The jig is formed to include a rectangular-shaped well portion 16 adjacent its pressplate portion 17; the well 16 being occupied by a flush-surfaced heat-insulating pad 18 made of some suitable asbestos composition or the like. The pad 18 is planwise shaped and dimensioned to be congruent with an image impression area of the mold sheet to be processed; a typical mold sheet being shown at 20 in the drawing herewith. The jig 15 is planwise dimensioned so as to accommodate at one end thereof the mold sheet to be processed in flatwise supported manner, while being widthwise dimensioned to allow for subsequent shifting of the mold sheet progressively into different processing positions while still providing flatwise support for the sheet.

Figure 3:
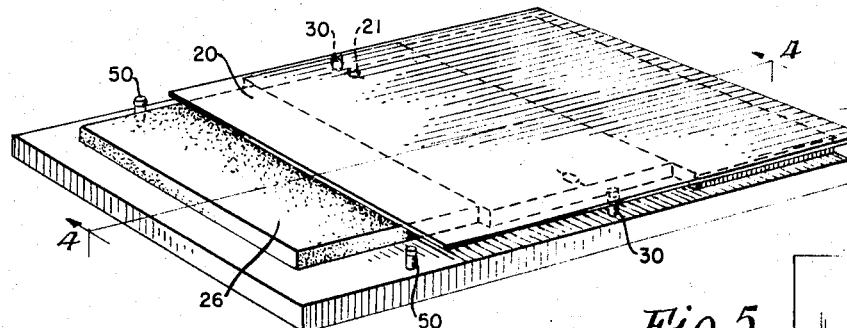
Figure 5:
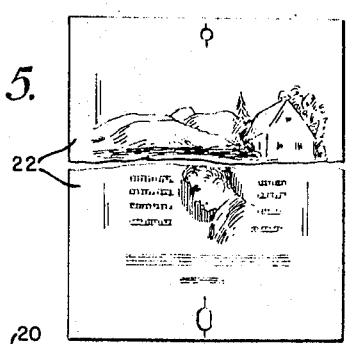
FIG. 5 is a fragmentary plan view of a typical engraving such as may be employed in the process.

By way of example as shown in the drawing herewith, the jig may be widthwise dimensioned so as to receive initially at the right-hand side of the jig as shown at FIG. 3, a two-image mold sheet in flatwise-supported relation, for an initial impression processing as shown at FIG. 6. The jig is also extended towards the left so as to accommodate a subsequent shifting of the mold sheet toward the left into a second impression-processing position, such as is illustrated at FIG. 9. However, it is to be understood that the apparatus and the method of the invention may be adapted with equal facility to the impressing of any other number of image multiples upon the mold sheets; but in the interest of simplification of the specification herein the apparatus and method of the present invention are illustrated and will be hereinafter described in relation to the processing of two-image mold sheets only.

Figure 2:
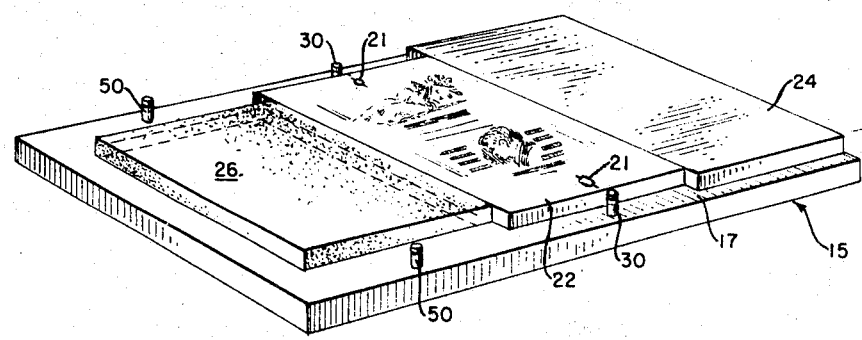

As illustrated at FIGS. 1-3, the jig 15 is provided intermediately of its width with a pair of upstanding pins 21-21 for properly positioning the engraving to be employed for image impression purposes on an intermediate surface portion of the jig 15; the engraving being illustrated at 22 (FIGS. 2-5). An engraving of the type referred to typically comprises a copper plate photoengraved to provide the requisite image impression area. For rigidity purposes the engraving is of suitable thickness; and therefore in order to provide a smooth support surface for the mold sheet to be processed, an auxiliary support plate 24 (FIGS. 2, 4, 6, 9) made of steel or the like is provided. The plate 24 is so dimensioned as to be manually positionable on the jig so as to lie snugly along the right-hand edge of the engraving. A similar support for the mold sheet alongside the left-hand edge of the engraving is provided in the form of a cork pad 26 (FIGS. 2, 3, 4, 6, 9, 10), which rests upon the heat-insulating pad 18. Thus, as best illustrated at FIG. 9, when the mold sheet 20 is pressed against the engraving the entire mold sheet will be supported in evenly flatwise manner.

Figure 4:
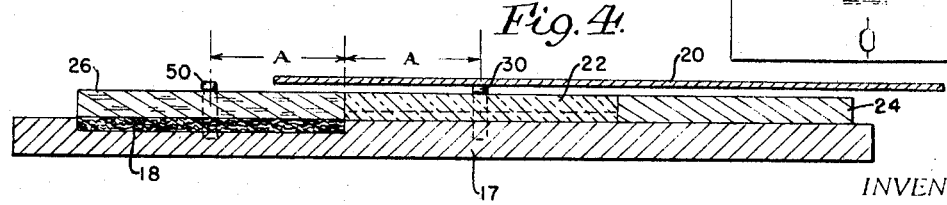
FIG. 4 is a sectional view taken as suggested by line 4-4 of FIG. 3.

It is a particular feature of the present invention that the jig 15 is also provided marginally of its engraving support area with a pair of register impression-making pins 30-30 which may be peripherally grooved adjacent their upper ends; the pins being dimensioned to project at their upper ends above the support surface profile of the engraving and auxiliary support pad assembly. Thus, when the mold sheet is first positioned generally flatwise on the assembly it rests upon the pins 30-30 as best illustrated at FIG. 4. The assembly is now ready to be processed in a mold press as illustrated for example at FIG. 6.

The mold sheet 20 may be made of any suitable thermoplastic material such as a polyvinylchloride or acetate copolymer or the like such as softens at temperatures in the neighborhood of 160° F. sufficiently to adapt it to precisely complement the contours of the engraving image area when pressed thereagainst. Thus for example, as illustrated at FIG. 6, a mold sheet of this type may be readily processed in a heat press comprising an upper platen 32 and a lower platen 34 operated by a hydraulic ram 36. The lower platen 34 may be arranged as shown to be alternately heated and cooled as by means of steam and cooling fluid circulated through a heat exchange conduit system as indicated at 38; the heating-cooling sequences being controlled as by means of a valve as indicated at 40. A relatively thick blanket of compressible and somewhat resilient material as indicated at 42 is disposed between the mold sheet 20 and the platen 32. Thus, it will be appreciated that the press apparatus may be temperature regulated (either manually or automatically) to initially bring the mold sheet up to the requisite temperature as it rests on the jig assembly; and then hydraulically operated to press the engraving up against the mold sheet so as to reproduce the image thereof on the mold sheet.

At the same time, the heads of the pins 30-30 are impressed into the mold sheet (at positions extraneously of the image area) so as to punch into and/or plastically deform the mold sheet locally, thereby providing therein pockets as indicated at 44 (FIGS. 7-13). The valve 40 is then reversed to inject cooling fluid through the heat exchange system, whereby the mold sheet is lowered in temperature to the point that the material thereof sets firmly in image and pin head shape-conforming condition. The press is then opened and the mold sheet stripped from the engraving and from the pins 30-30. The resiliency characteristics of the mold sheet material permits the stripping operation to be performed easily and without damage to the image impression and/or to the pin-impressed pockets 44 in the mold sheet.

A second pair of register pins as indicated at 50-50 are provided to extend from the left-hand portion of the jig marginally of the mold sheet support portion thereof, in the manner of the register pins 30-30. The pins 50-50 are plan view positioned on the jig so that after the mold sheet has received its first image impression and has been stripped from the jig as explained hereinabove, it may be shifted toward the left until the pocket portions 44-44 thereof meet the register pins 50-50. The sheet is then pressed down, whereupon it snap fastens upon the heads of the pins 50-50. The parts are so dimensioned and arranged that the mold sheet is thereby accurately positioned so as to bring the engraving 22 into precise register with the intended next adjacent image receiving area of the mold sheet.

The assembly is then subjected to another heat press operation as described hereinabove, whereby the second image impression is made in precise register with the first impression. The mold sheet is then again stripped away from the assembly, for subsequent further processing in accord with conventional practice. The provision of peripheral grooves adjacent the top ends of the pins 30-30 is optional, but when employed will import to the inner bores of the register pockets 44-44 slightly reduced diameter "throat" constrictions which operate to augment the holding actions of the pockets on the pins 50-50 when the mold sheet is advanced for the next successive image-impressing operation, as explained hereinabove.

It is a particular feature of the present invention that when the mold sheet is shifted after receiving an image impression, the freshly made image impression is thereby disposed to rest upon the cork pad 26 which is heat insulated from the press bed by the pad 18. It is by virtue of this arrangement that successively applied heat press operations do not result in any substantial reheating of freshly made image impressions, thereby avoiding resoftening of the last-made impressions and any deformation thereof. Hence, the overall operation may be performed rapidly and without interruptions between successive pressing operations; thereby effecting substantial manufacturing economies and producing multiple images in perfect register. It is another important feature of the invention that because the register pin units 30-30 and 50-50 are precisely located once and for all when the jig is made, the multiple-pressing operations may thenceforth be conducted on the mold sheet with eminent success by a relatively unskilled operator.

As explained hereinabove, whereas the invention has been illustrated herein only in conjunction with a two-image mold-sheet-making operation it is equally applicable to the fabrication of mold sheets having any other number of image multiples thereon. Also, it is to be understood that although only one form of the invention has been illustrated and described in detail hereinabove, it will be understood that various changes may be made therein without departing from the spirit of the invention or the scope of the following claims.

We claim:

1. An apparatus for making a multiple-image matrix for a printing plate from an engraving or the like; said apparatus comprising a jig adapted to be positioned between the platens of a heat press having means for alternately heating and cooling the engraving-supporting platen;

said jig comprising a pressplate portion adapted to support the engraving when mounted thereon and to support flatwise thereabove the image-impression-receiving area of a mold sheet to be impressed with multiple images of said engraving;

register-guide-pocket-forming means carried by said jig marginally of the image-impressing area thereof for impressing register guide pockets into said sheet incidental to impressing of an image thereon;

a heat-insulating pad carried by said jig adjacent the pressplate portion thereof and dimensioned so as to receive and support the first image-impressed portion of said sheet when the latter is shifted following a first image impression operation thereon, in preparation for the next successive image impression operation thereon;

and register guide means extending from said jig marginally of said pad and so positioned as to cooperate with the guide pockets formed in said sheet incidental to the previous image impression operation thereon as to guide the shifting of said sheet preparatory to the next image impression operation into the precisely desired position relative to said engraving.

2. An apparatus as set forth in claim 1 wherein said heat-insulating pad is disposed in top surface flush relation with said pressplate portion of said jig so as to continuously flatwise support said mold sheet as it is shifted relative to said pressplate portion of said jig.

3. An apparatus as set forth in claim 2 including a resilient blanket member backing said mold sheet relative to said engraving and said guide-pocket-forming means incidental to each image impression operation of the press.